United States Patent
Sawada et al.

(10) Patent No.: US 9,698,696 B2
(45) Date of Patent: Jul. 4, 2017

(54) INSULATION TYPE SWITCHING POWER SUPPLY APPARATUS

(71) Applicant: ROHM CO., LTD., Kyoto (JP)

(72) Inventors: Hiroshi Sawada, Kyoto (JP); Satoshi Oishi, Kyoto (JP); Koji Takahata, Kyoto (JP); Yohei Akamatsu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 584 days.

(21) Appl. No.: 14/225,739

(22) Filed: Mar. 26, 2014

(65) Prior Publication Data

US 2014/0312684 A1    Oct. 23, 2014

(30) Foreign Application Priority Data

Apr. 22, 2013  (JP) ................. 2013-089512

(51) Int. Cl.
*H02M 3/33* (2006.01)
*H02M 3/335* (2006.01)

(52) U.S. Cl.
CPC .............. *H02M 3/33523* (2013.01)

(58) Field of Classification Search
CPC ................................ H02M 3/33523
USPC ....................... 307/9.1; 363/21.17
See application file for complete search history.

(56) References Cited

U.S. PATENT DOCUMENTS

| 7,463,497 | B2 | 12/2008 | Negrete |
| 7,471,522 | B2 | 12/2008 | Ng et al. |
| 2013/0038308 | A1 | 2/2013 | Sumitomo |
| 2014/0049237 | A1 | 2/2014 | Hara et al. |
| 2014/0077867 | A1* | 3/2014 | Chen ............ H02M 3/156 327/535 |

FOREIGN PATENT DOCUMENTS

| JP | 2003-033021 A | 1/2003 |
| JP | 2013-038904 A | 2/2013 |
| WO | 2012/147609 A1 | 11/2012 |

OTHER PUBLICATIONS

Japanese Patent Office Action mailed on Jan. 31, 2017 in corresponding Japanese Patent Application No. 2013-089512, with English Translation.

* cited by examiner

*Primary Examiner* — Joseph Chang
(74) *Attorney, Agent, or Firm* — Fish & Richardson P.C.

(57) ABSTRACT

A power supply apparatus comprises: a transformer that includes primary/secondary windings that are electromagnetically connected to each other with polarities opposite to each other, an output switch that activates/inactivates an electric-current route that extends from an application terminal for an input voltage to a ground terminal via the primary winding a rectifying-smoothing portion that generates an output voltage from an induced voltage, a feedback voltage generation portion that monitors a switch voltage appearing at a connection node between the primary winding and the output switch and generates a feedback voltage in accordance with the output voltage, a reference voltage generation portion that generates a reference voltage, a comparator that compares the feedback voltage and the reference voltage with each other to generate a comparison signal, and a switching control portion that generates an output switch control signal by means of an on-time control method in accordance with the comparison signal.

14 Claims, 10 Drawing Sheets

INSULATION TYPE SWITCHING POWER SUPPLY APPARATUS

CROSS-REFERENCE TO RELATED APPLICATIONS

This application is based on Japanese Patent Application No. 2013-089512 filed on Apr. 22, 2013, the contents of which are hereby incorporated by reference.

BACKGROUND OF THE INVENTION

1. Field of the Invention

The present invention relates to an insulation type switching power supply apparatus.

2. Description of Related Art

Generally, an insulation type switching power supply apparatus has a structure in which an auxiliary winding and a photo-coupler are used to perform feedback control of an output voltage (see FIG. 9 and FIG. 10).

Besides, insulation type switching power supply apparatuses, which perform feedback control of an output voltage without using an auxiliary winding and a photo-coupler, are also proposed (U.S. Pat. No. 7,463,497 and U.S. Pat. No. 7,471,522) (hereinafter, called patent documents 1 and 2).

However, in a first conventional example (FIG. 9) that uses an auxiliary winding, there are problems of a needed custom transformer, board area increase, and cost increase. Besides, in a second conventional example (FIG. 10), there are problems of consumed electric current increase (efficiency deterioration), long-term reliability decline, board area increase, and cost increase.

Besides, the conventional techniques of the patent document 1 and patent document 2 need an error amplifier, a sample/hold circuit and the like, and have room for further improvement as to circuit scale reduction.

SUMMARY OF THE INVENTION

In light of the problems found by the inventors of the present application, it is an object of the present invention to provide an insulation type switching power supply apparatus that can perform feedback control of an output voltage without using an auxiliary winding and a photo-coupler.

An insulation type switching power supply apparatus disclosed in the present specification comprises: a transformer that includes a primary winding and a secondary winding that are electromagnetically connected to each other with polarities opposite to each other, an output switch that activates/inactivates an electric-current route that extends from an application terminal for an input voltage to a ground terminal via the primary winding, a rectifying-smoothing portion that generates an output voltage by rectifying and smoothing an induced voltage, a feedback voltage generation portion that monitors a switch voltage appearing at a connection node between the primary winding and the output switch and generates a feedback voltage in accordance with the output voltage, a reference voltage generation portion that generates a reference voltage, a main comparator that compares the feedback voltage and the reference voltage with each other to generate a comparison signal, and a switching control portion that generates an output switch control signal by means of an on-time control method in accordance with the comparison signal.

Other features, elements, steps, advantages and characteristics of the present invention will become more apparent from the following detailed description of preferred embodiments with reference to the relevant attached drawings.

DESCRIPTION OF THE PREFERRED EMBODIMENTS

<Whole Structure>

Figure 1:
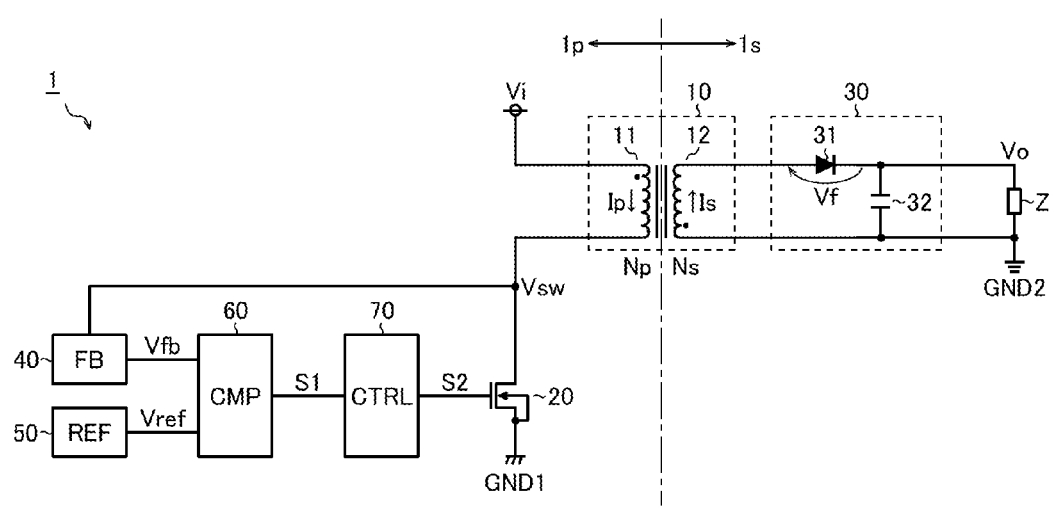
FIG. 1 is a diagram showing a whole structure of an insulation type switching power supply apparatus.

FIG. 1 is a block diagram showing a whole structure of an insulation type switching power supply apparatus. The insulation type switching power supply apparatus 1 in the present structural example is a DC/DC converter of flyback type that electrically insulates a primary circuit system $1p$ (GND 1 system) and a secondary circuit system $1s$ (GND 2 system) from each other, generates an output voltage Vo from an input voltage Vi, and supplies the output voltage Vo to a load Z. The insulation type switching power supply apparatus 1 in the present structural example has: a transformer 10; a an N channel type MOS [metal oxide semiconductor] field effect transistor 20; a rectifying-smoothing portion 30; a feedback voltage generation portion 40; a reference voltage generation portion 50; a main comparator 60; and a switching control portion 70.

The transformer 10 electrically insulates the primary circuit system $1p$ and the secondary circuit system $1s$ from each other and includes a primary winding 11 (the number of turns Np) and a secondary winding 12 (the number of turns Ns) that are electromagnetically connected to each other with polarities opposite to each other. A first terminal of the primary winding 11 is connected to an application terminal for the input voltage Vi. A second terminal of the primary winding 11 is connected to a ground terminal GND 1 of the primary circuit system $1p$ via the transistor 20. A first terminal of the secondary winding 12 is connected to an application terminal (power supply input terminal for a load Z) for the output voltage Vo via the rectifying-smoothing portion 30. A second terminal of the secondary winding 12 is connected to a ground terminal GND 2 of the secondary circuit system $1s$. In the meantime, the number of turns Np and Ns may be adjusted arbitrarily such that the desired output voltage Vo is obtained. For example, the larger the number of turns Np is or the smaller the number of turns Ns is, the lower the output voltage Vo becomes, reversely, the smaller the number of turns Np is or the larger the number of turns Ns is, the higher the output voltage Vo becomes.

The transistor 20 is an output switch that activates/inactivates an electric-current route that extends from the application terminal for the input voltage Vi to the ground terminal GND 1 via the primary winding 11. Describing a connection relationship, a drain of the transistor 20 is connected to the second terminal of the primary winding 11. A source and a back gate of the transistor 20 are all connected to the ground terminal GND 1. A gate of the transistor 20 is connected to an application terminal for a gate signal (output switch control signal) S2.

The rectifying-smoothing portion 30 includes a rectifying diode 31 (forward drop voltage Vf) and a smoothing capacitor 32, and generate the output voltage Vo by rectifying and smoothing an induced voltage that occurs in the secondary winding 12. Describing a connection relationship, an anode of the diode 31 is connected to the first terminal of the secondary winding 12. A cathode of the diode 31 and a first terminal of the capacitor 32 are all connected to the application terminal for the output voltage Vo. A second terminal of the capacitor 32 is connected to the ground terminal GND2.

The feedback voltage generation portion 40 monitors a switch voltage Vsw appearing at a connection node between the primary winding 11 and the transistor 20 and generates a feedback voltage Vfb in accordance with the output voltage Vo. The switch voltage Vsw obtained during an off-time of the transistor 20 is expressible by the following formula (1).

$$Vsw = \frac{Np}{Ns} \cdot (Vo + Vf) + Vi \quad (1)$$

As is understood from the above formula (1), as to the switch voltage Vsw obtained during the off-time of the transistor 20, its voltage value changes in accordance with the output voltage Vo. Accordingly, by generating the feedback voltage Vfb from the switch voltage Vsw, it is possible to perform feedback control of the output voltage Vo without using an auxiliary winding and a photo-coupler. A structure and operation of the feedback voltage generation portion 40 are described in detail later.

The reference voltage generation portion 50 generates a predetermined reference voltage Vref. A structure and operation of the reference voltage generation portion 50 are described in detail later.

The main comparator 60 compares the feedback voltage Vfb and the reference voltage Vref with each other to generate a comparison signal S1. The comparison signal S1 is a logical signal that detects that the feedback voltage Vfb (and the output voltage Vo) declines to a predetermined lower limit value (bottom value). For example, the comparison signal S1 goes to a low level (logical level during a time when a bottom is not detected) when the feedback voltage Vfb is higher than the reference voltage Vref, and goes to a high level (logical level during a time when the bottom is detected) when the feedback voltage Vfb is lower than the reference voltage Vref.

The switching control portion 70 generates an output switch control signal S2 in accordance with the comparison signal S1 by means of an on-time control method. A structure and operation of the switching control portion 70 are described in detail later.

In the insulation type switching power supply apparatus 1 in the present structural example, when the transistor 20 is kept in an on-state, an primary current Ip flows from the application terminal for the input voltage Vi to the ground terminal GND 1 via the primary winding 11 and the transistor 20; accordingly, electric energy is stored in the primary winding 11. On the other hand, when the transistor 20 is kept in an off-state, an induced voltage occurs in the secondary winding 12 electromagnetically connected to the primary winding 11, and a secondary current Is flows from the secondary winding 12 to the ground terminal GND 2 via the diode 31. At this time, the output voltage Vo, which is obtained by applying half-wave rectification to the induced voltage in the second winding 12, is supplied to the load Z.

As described above, according to the insulation type switching power supply apparatus 1 in the present structural example, it is possible to electrically insulate the primary circuit system 1p and the secondary circuit system 1s from each other, generate the output voltage Vo from the input voltage Vi, and supply the output voltage Vo to the load Z. In the meantime, the flyback type is smaller in the number of components than a forward type that needs a smoothing inductor, accordingly, it is sayable that the flyback type is advantageous to cost reduction.

Figure 10:
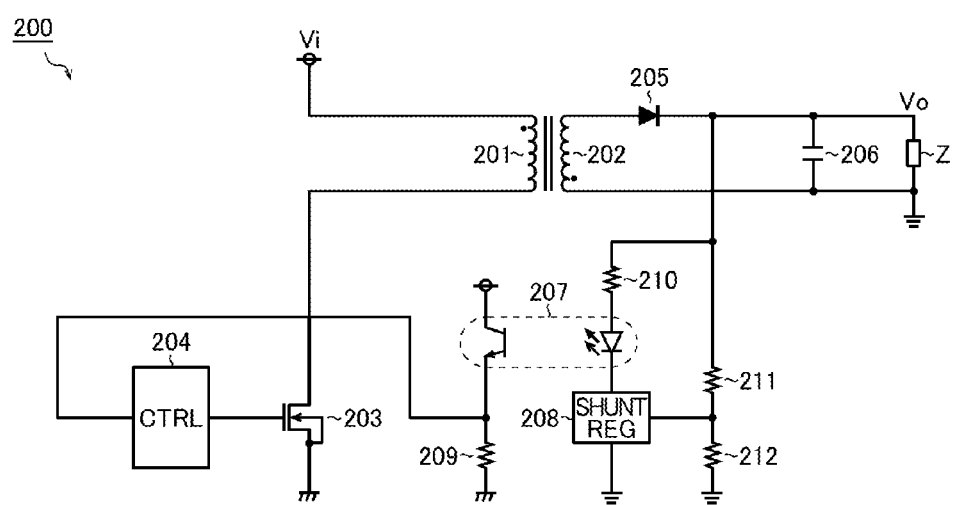
FIG. 10 is a diagram showing a second conventional example of an insulation type switching power supply apparatus.

Besides, according to the insulation type switching power supply apparatus in the present structural example, compared with the conventional structure (FIG. 10) that uses an auxiliary winding and a photo-coupler, it becomes possible to enjoy advantages of an unnecessary custom transformer (a general-purpose transformer is usable), consumed current reduction (efficiency increase), long-term reliability increase, board area reduction, and cost reduction.

Further, according to the insulation type switching power supply apparatus in the present structural example, unlike the conventional structures (see patent documents 1 and 2) that perform pulse width control of the output switch control signal in accordance with the feedback voltage, the on-time control method of bottom detection type is employed; accordingly, it is possible to perform the feedback control of the output voltage Vo without requiring an error amplifier and a sample-and-hold circuit. Accordingly, it becomes possible to achieve more circuit scale reduction than the conventional.

<Feedback Voltage Generation Portion>

Figure 2:
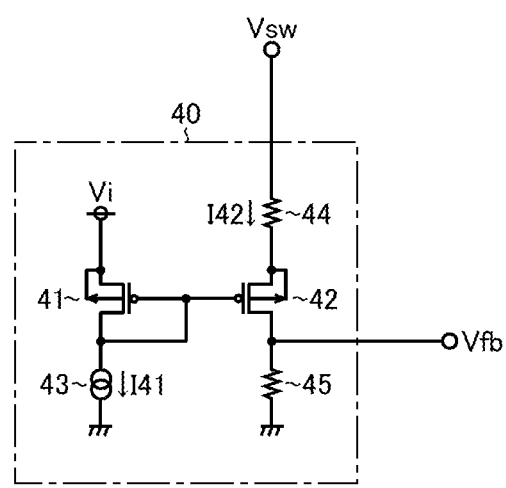
FIG. 2 is a diagram showing a structural example of a feedback voltage generation portion 40.

FIG. 2 is a diagram showing a structural example of the feedback voltage generation portion 40. The feedback voltage generation portion 40 in the present structural example includes: P channel type MOS field effect transistors 41 and 42; a constant current source 43; resistors 44 and 45 (resistance values R44 and R45). A source and a back gate of the transistor 41 are all connected to the application terminal for the input voltage Vi. Gates of the transistors 41 and 42 are all connected to a drain of the transistor 41. The drain of the transistor 41 is connected to the ground terminal GND 1 via the constant current source 43. A source and a back gate of the transistor 42 are all connected to a first terminal of the resistor 44. A second terminal of the resistor 44 is connected to the application terminal for the switch voltage Vsw. A drain of the transistor 42 is connected to an application terminal for the feedback voltage Vfb and a first terminal of the resistor 45. A second terminal of the resistor 45 is connected to the ground terminal GND 1. In the meantime, the resistors 41 and 42 each may be replaced with a pnp type bipolar transistor.

In the feedback voltage generation portion 40 in the present structural example, the transistors 41 and 42 function as a source follower that fixes the source of the transistor 42 at the input voltage Vi. In the meantime, a bias current I41 generated by the constant current source 43 may be set at a size that is necessary for a forward bias of the transistor 41.

If the source of the transistor 42 is fixed at the input voltage Vi, a difference voltage (Vsw−Vi) between the switch voltage Vsw and the input voltage Vi is applied across the resistor 44. As result of this, an electric current I42 (=(Vsw−Vi)/R44) in accordance with the voltage (Vsw−Vi) between both terminals flows in the resistor 44. If the electric current I42 flows to the ground terminal GND 1 via the resistor 45, the feedback voltage Vfb (=I42×R45=(Vsw−Vi)×(R45/R44)) in accordance with the electric current I42 is output from the first terminal of the resistor 45. In the meantime, by adjusting the resistance values R44 and R45, it is possible to arbitrarily apply a level shift to the feedback voltage Vfb.

As described above, the feedback voltage generation portion 40 in the present structural example generates the feedback voltage Vfb by performing the level shift by subtracting the input voltage Vi from the switch voltage Vsw that is obtained during the off-time of the transistor 20. In a case where the feedback control is performed such that the feedback voltage Vfb and the reference voltage Vref become equal to each other, the output voltage Vo is expressible by the following formula (2).

$$Vo = \frac{R44}{R45} \cdot \frac{Ns}{Np} \cdot Vref - Vf \quad (2)$$

<Reference Voltage Generation Portion>

Figure 3:
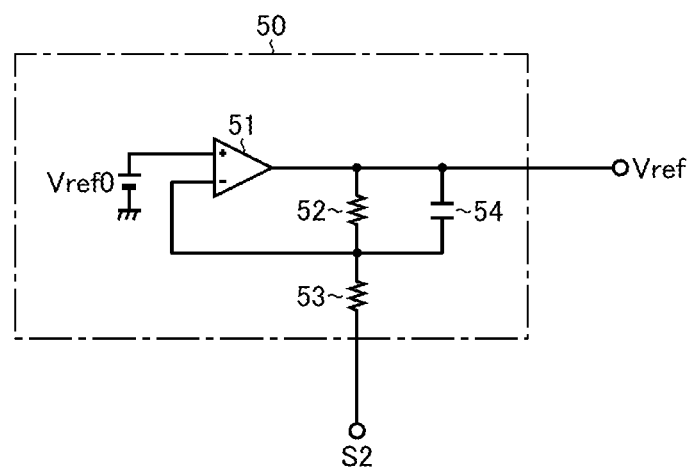
FIG. 3 is a diagram showing a structural example of a reference voltage generation portion 50.

FIG. 3 is a diagram showing a structural example of the reference voltage generation portion 50. The reference voltage generation portion 50 in the present structural example includes an operational amplifier 51, resistors 52 and 53, and a capacitor 54. A non-inverting input terminal (+) of the operational amplifier 51 is connected to an application terminal for a constant voltage Vref0 (a constant band gap voltage and the like that do not depend on a change in the input voltage Vi and ambient temperature). An output terminal of the operational amplifier 51, a first terminal of the resistor 52, and a first terminal of the capacitor 54 are all connected to the application terminal for the reference voltage Vref. A second terminal of the resistor 52, a second terminal of the capacitor 54, and a first terminal of the resistor 53 are all connected to an inverting input terminal (−) of the operational amplifier 51. A second terminal of the resistor 53 is connected to the application terminal for the gate signal S2.

In the meantime, the resistors 52, 53 and the capacitor 54 pulse-drive a negative feedback loop of the operational amplifier 51 in accordance with the gate signal S2. As a result of this, the reference voltage Vref output from the operational amplifier 51 has a waveform whose voltage value changes periodically with respect to the constant voltage Vref0, that is, a waveform with a ripple component injected in the constant voltage Vref0 (see FIG. 5).

As described above, the reference voltage generation portion 50 in the present structural example injects the ripple component, which is generated by using the gate signal S2, into the constant voltage Vref0 and outputs the reference voltage Vref with the injected ripple component to the main comparator 60. By introducing such a ripple injection technique, it becomes possible to perform stable switching control even if a change amount of the feedback voltage is not very large.

<Switching Control Portion>

Figure 4:
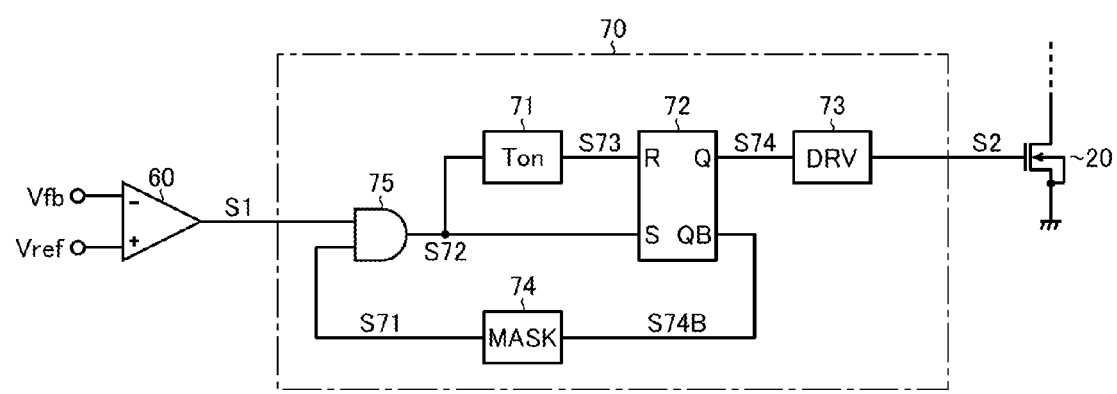
FIG. 4 is a diagram showing a structural example of a switching control portion 70.

FIG. 4 is a diagram showing a structural example of the switching control portion 70. The switching control portion 70 in the present structural example includes: an on-time setting portion 71; an RS latch circuit 72; a driver 73; a mask signal generation portion 74; and an AND gate 75.

The on-time setting portion 71 generates an on-time setting signal S73 receiving an input of an AND gate signal S72 (which corresponds to the comparison signal S1 after undergoing a mask process). Describing more specifically, the on-time setting portion 71 makes a high-level trigger pulse occur in the on-time setting signalS73 at a time point when a predetermined on-time Ton elapses after the AND signal S72 is raised to a high level. A structure and operation of the on-time setting portion 70 are described in detail later.

The RS latch circuit 72 generates a driver control signal S74 (and an inverting driver control signal S74B) in accordance with the AND signal S72 and the on-time setting signal S73. Describing more specifically, The RS latch circuit 72 sets the driver control signal S74 to a high level at a rising edge of the AND signal S72 that is input into a set terminal (S), and resets the driver control signal S74 to a low level at a rising edge of the on-time setting signal S73 that is input into a reset terminal (R).

The driver 73 generates a gate signal S2 in accordance with the driver control signal S74, and performs on/off control of the transistor 20. The transistor 20 is turned on when the gate signal S2 is at a high level, and turned off when the gate signal S2 is at a low level.

The mask signal generation portion 74 receives an input of the inverting driver control signal S74 to generate a mask signal S71. The mask signal S71 is fixed at a low level until a predetermined mask time Tmask elapses after the inverting driver control signal S74 is raised to a high level.

The AND gate 75 performs a logical product operation between the comparison signal S1 and the mask signal S71 to generate an AND signal S72. When the mask signal S71 is at a high level, the comparison signal S1 is through-output as the AND signal S72. On the other hand, when the mask signal S71 is at a low level, the AND signal S72 is fixed at a low level irrespective of the logical level of the comparison signal S1.

In other words, the above mask signal generation portion 74 and the AND gate 75 function as a mask process portion that fixes the comparison signal S71 at a logical level at a bottom not-detected time over a predetermined mask period Tmask after the transistor 20 is turned off. By employing such a structure, it is possible to mask an unnecessary pulse of the comparison signal S1 caused by ringing of the switch voltage Vsw that occurs during an off-time of the transistor 20; accordingly, it becomes possible to raise the stability of the switching control.

In the meantime, in the present structural example, the structure is described as an example, in which the mask process portion is disposed in a post-stage of the main comparator 60; however, the insertion position of the mask process portion is not limited to this, but it is also possible to dispose the mask process portion in a pre-stage (input stage of the feedback voltage Vfb) of the main comparator 60.

Figure 5:
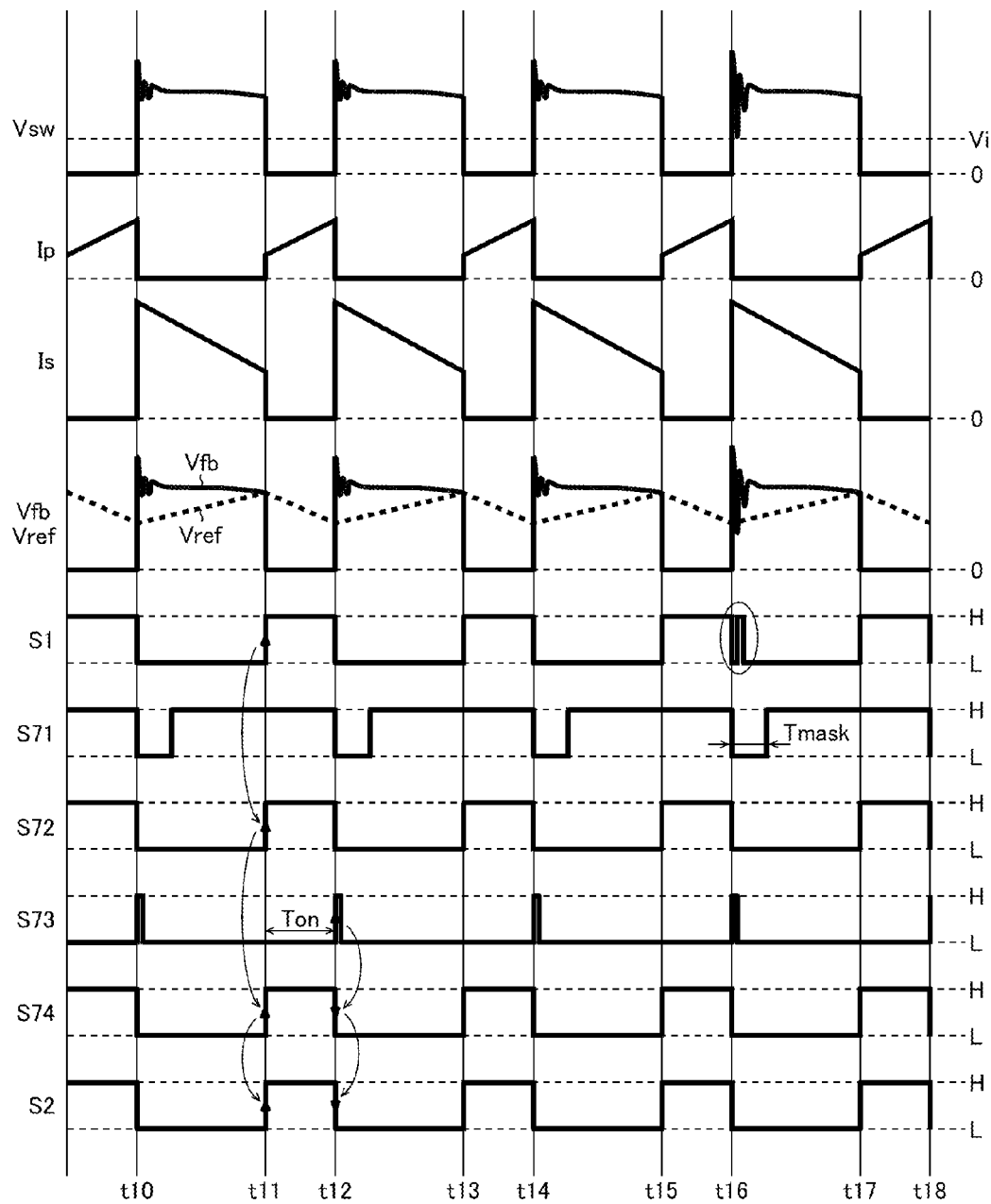
FIG. 5 is a time chart showing an example of a switching control operation.

FIG. 5 is a time chart showing an example of the switching control operation, and illustrates, from top in order, the switch voltage Vsw; the primary current Ip; the secondary current Is; the feedback voltage Vfb (solid line);

the reference voltage Vref (broken line); the comparison signal S1; the mask signal S71; the AND signal S72; the on-time setting signal S73; the driver control signal S74; and the gate signal S2.

At a time point t10, if the transistor 20 is turned off, the switch voltage Vsw increases to a voltage value (see the above formula (1)) higher than the input voltage Vi. As a result of this, the feedback voltage Vfb becomes higher than the reference voltage Vref; accordingly, the comparison signal S1 goes to the low level.

Thereafter, the switch voltage Vsw (and the feedback voltage Vfb) declines gradually as the secondary current Is (and the output voltage Vo declines) decreases. Reversely, the reference voltage Vref increases gradually because of a ripple injection function of the reference voltage generation portion 50.

And, at a time point t1, if the feedback voltage Vfb becomes lower than the reference voltage Vref, the comparison signal S1 rises to the high level. At this time, the mask signal S71 stays at the high level; accordingly, as the AND signal S72, the comparison signal S1 is through-output. Accordingly, the driver control signal S74 is set to the high level at a rising edge of the AND signal S72, and the gate signal S2 is raised to the high level. As a result of this, the transistor 20 is turned on; accordingly, the switch voltage Vsw is pulled down to 0 V, and the primary current Ip begins to increase. Besides, the on-time setting portion 71 starts to count the on-time Ton at the time point t11.

Thereafter, the reference voltage Vref declines gradually because of the ripple injection function of the reference voltage generation portion 50. On the other hand, during a time when the transistor 20 is kept in an on-state, the switch voltage Vsw (and the feedback voltage Vfb) stays at 0 V. Accordingly, the comparison signal S1 is kept at the high level even after the time point t11.

And, at a time point t12, if the counting of the on-time Ton is completed, a high-level trigger pulse is generated in the on-time setting signal S73. Accordingly, the driver control signal S74 is reset to the low level at a rising edge of the on-time setting signal S73, and the gate signal S2 is dropped to the low level. As a result of this, the transistor 20 is turned off accordingly, like at the above time point t10, the switch voltage Vsw increases to a voltage value higher than the input voltage Vi, and the comparison signal S1 goes to the low level.

Even after the time point t12, basically, the same switching control operation as in the above description is repeated. In the meantime, in the switching control portion 70 in the present structural example, each time the transistor 20 is turned off, the mask signal S71 is brought to the low level over the predetermined mask period Tmask. Accordingly, at a time point t16, it is possible to mask the unnecessary pulse of the comparison signal S1 caused by the ringing of the switch voltage Vsw that occurs during the off-time of the transistor 20; accordingly, it becomes possible to raise the stability of the switching control.

<On-Time Setting Portion>

Figure 6:
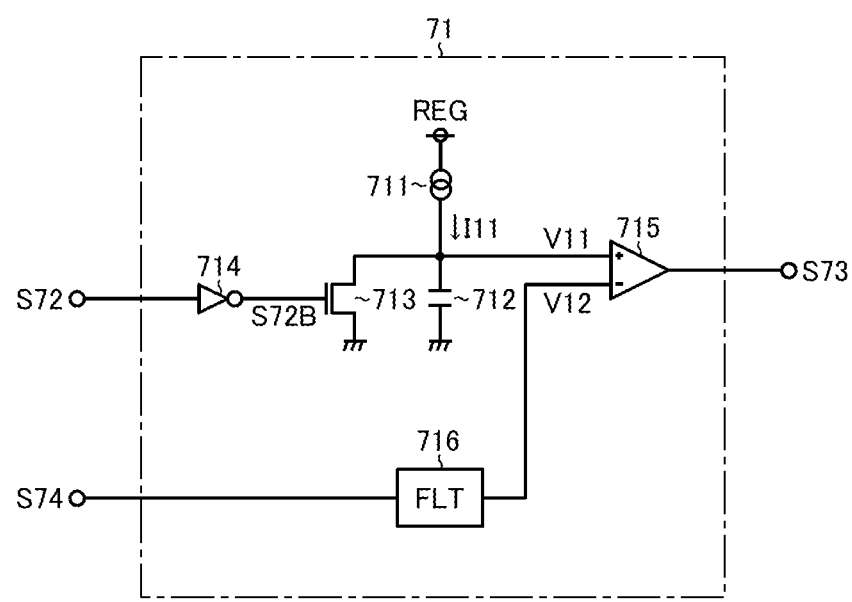
FIG. 6 is a diagram showing a structural example of an on-time setting portion 71.

FIG. 6 is a diagram showing a structural example of the on-time setting portion 71. The on-time setting portion 71 in the present structural example includes: a constant current source 711; a capacitor 712; an N channel type MOS field effect transistor 713; an inverter 714; a comparator 715; and a filter 716.

The constant current source 711 operates by receiving supply of a constant internal power supply voltage REG (e.g., 5 V) that does not depend on the input voltage Vi and a change in ambient temperature, and generates a constant charge current I11 that does not depend on the input voltage Vi.

A first terminal of the capacitor 712 is connected to the constant current source 711. A second terminal of the capacitor 712 is connected to the ground terminal GND 1. When the transistor 713 is kept in an off-state, the capacitor 712 is charged by the charge current I11, and a first voltage V11 appearing at the first terminal of the capacitor 712 increases. On the other hand, when the transistor 713 is kept in an on-state, the capacitor 712 is discharged via the transistor 713, and the first voltage V11 declines.

The transistor 713 is a charge-discharge switch that switches charge and discharge of the capacitor 712 in accordance with an inverting AND signal S72B (logic inverted signal of the AND signal S72). A drain of the transistor 713 is connected to the first terminal of the capacitor 712. A source of the transistor 713 is connected to the ground terminal GND 1. A gate of the transistor 713 is connected to an application terminal for the inverting AND signal S72B.

The inverter 714 generates the inverting AND signal S72B by reversing a logical level of the AND signal S72.

In the meantime, the above constant current source 711, the capacitor 712, the transistor 713, and the inverter 714 correspond to a first voltage generation circuit that generates the first voltage V11 in accordance with the charge-discharge operation of the capacitor 712.

The comparator 715 generates the on-time setting signal S73 by comparing the first voltage V11 input into a non-inverting input terminal (+) and the second voltage V12 input into an inverting input terminal (−) with each other. The on-time setting signal S73 goes to a high level when the first voltage V11 is higher than the second voltage V12, and goes to a low level when the first voltage V11 is lower than the second voltage V12.

The filter 716 generates the second voltage V12 by smoothing the driver control signal S74. As the filter 716, it is possible to use a CR filter that includes a capacitor and a resistor. In the meantime, instead of the driver control signal S74, the gate signal (output switch control signal) S2 may be input into the filter 716.

In the meantime, the above filter 716 corresponds to a second voltage generation circuit that generates the second voltage V12 in accordance with an on duty Don (=percentage of the on-time Ton to a period T) of the transistor 20.

Figure 7:
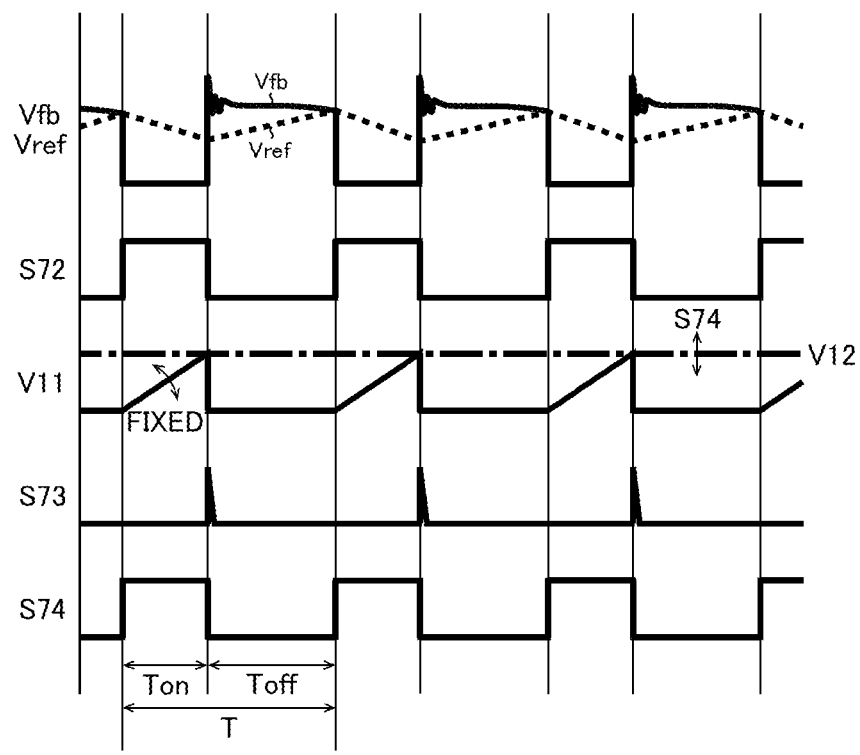
FIG. 7 is a time chart showing an example of an on-time setting operation.

FIG. 7 is a time chart showing an example of the on-time setting operation, and illustrates, from top in order, the feedback voltage Vfb; the reference voltage Vref, the AND signal 572; the first voltage V11 (solid line); the second voltage V12 (one-dot-one-bar line); the on-time setting signal S73; and the driver control signal S74.

If the feedback voltage Vfb declines to the reference voltage Vref during an off-period Toff of the transistor 20, the AND signal S72 rises to the high level and the driver control signal S74 is raised to the high level; accordingly, the transistor 20 is turned on. At this time, transistor 713 is turned off because of a high-level transition (low-level transition of the inverting AND signal S72B) of the AND signal S72; accordingly, the charge of the capacitor 712 by the charge current I11 is started. As described above, an electric-current value of the charge current I11 is a fixed value that does not depend on the input voltage Vi. Accordingly, the first voltage V11 increases at a constant increase degree (inclination) that does not depend on the input voltage Vi.

Thereafter, if the first voltage V11 increases to the second voltage V12 (the pseudo-output voltage Vo whose voltage value changes in accordance with an on-duty Don of the switch voltage Vsw), the on-time setting signal S73 rises to the high level and the driver control signal S74 is dropped to the low level; accordingly, the transistor 20 is turned off. At this time, the feedback voltage Vfb increases to a voltage value higher than the reference voltage Vref, accordingly, the AND signal S72 falls to the low level. As a result of this, the transistor 713 is turned on because of a low-level transition (high-level transition of the inverting AND signal S72B) of the AND signal S72; accordingly, the capacitor 712 is discharged via the transistor 713, and the first voltage V11 is pulled down to the low level.

As described above, the on-time setting portion 71 counts a time, which is necessary for the first voltage V11 to reach the second voltage V12 after the transistor 20 is turned on, as the on-time Ton. Here, the on-time setting portion 71 does not set the on-time Ton as a fixed value, but as a variable value in accordance with the on-duty Don of the transistor 20. Describing more specifically, the on-time setting portion 71 prolongs the on-time Ton by pulling up the second voltage V12 as the on-duty of the transistor 20 becomes larger, and shortens the on-time Ton by pulling down the second voltage V12 as the on-duty of the transistor 20 becomes smaller.

By employing such a structure, it is possible to curb a change in a switching frequency fsw without impairing an advantage of a non-linear control method (on-time control method of bottom detection type). Accordingly, it becomes possible to achieve improvement in output voltage accuracy and in load regulation characteristic, and facilitation of anti-EMI measures and anti-noise measures in set designing. Besides, it also becomes possible to use the insulation type switching power supply apparatus 1 with no trouble as a power supply device for an application in which an input voltage change is large and for an application that requires various output voltages.

Besides, in the on-time setting portion 71 in the present structural example, a calculation formula of the switching frequency fsw (=1/T) indicated by the following formula (3) does not contain any variables; accordingly, it is possible to completely remove the change in the switching frequency fsw.

$$fsw = \frac{1}{T} = \frac{Don}{Ton} = \frac{Don}{\frac{REG \cdot C \cdot Don}{I11}} = \frac{I11}{REG \cdot C} = \alpha(const.) \quad (3)$$

In the meantime, in the above formula (3), C indicates a capacitance value (constant) of the capacitor 712, and Don indicates an on-duty of the transistor 20.

<Application to Vehicle>

Figure 8:
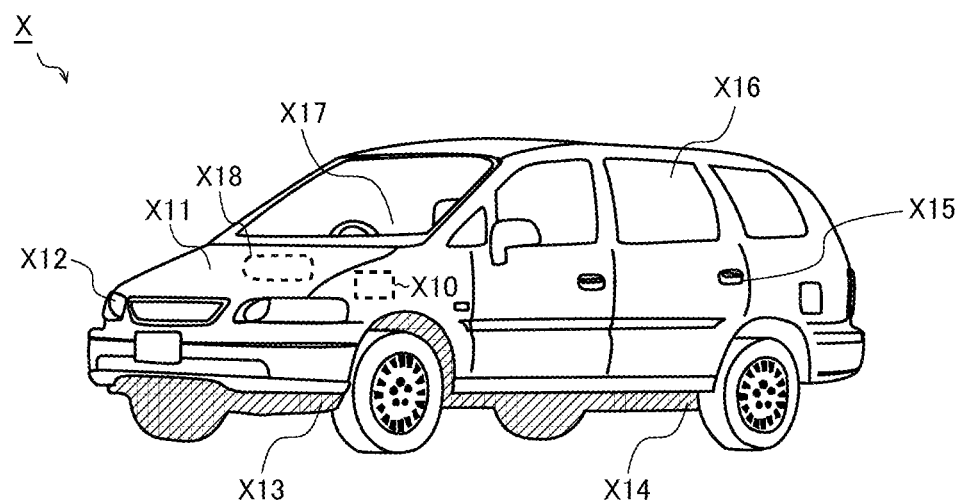
FIG. 8 is an appearance diagram showing a structural example of a vehicle that incorporates an insulation type switching power supply apparatus.
Figure 9:
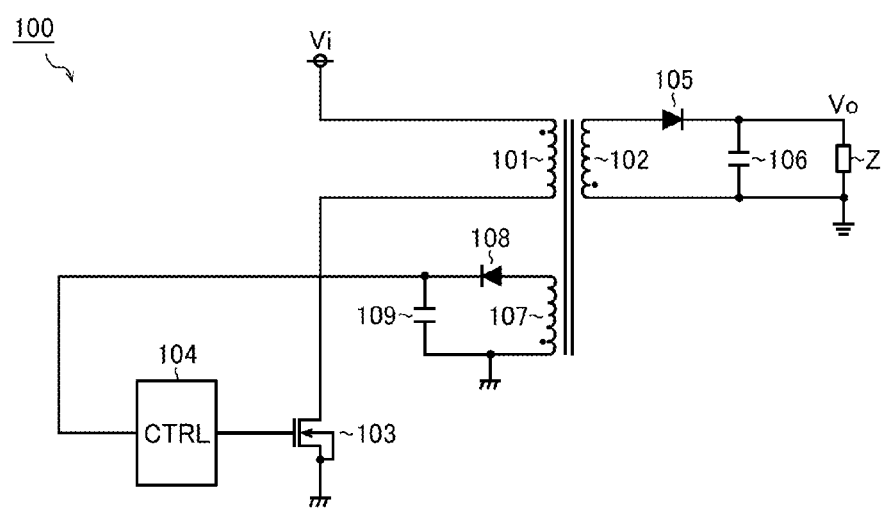
FIG. 9 is a diagram showing a first conventional example of an insulation type switching power supply apparatus.

FIG. 8 is an appearance diagram showing a structural example of a vehicle that incorporates the insulation type switching power supply apparatus. A vehicle X in the present structural example incorporates a battery X10 and various electronic devices X11 to X18 that receive the supply of the input voltage Vi to operate. In the meantime, there are some cases where incorporation positions of the battery X10 and electronic devices X11 to X18 in FIG. 8 differ from actual positions for the sake of illustration.

The electronic device X11 is an engine control unit that performs control (injection control, electronic throttle control, idling control, oxygen sensor heater control, auto cruise control and the like) related to an engine.

The electronic device X12 is a lamp control unit that performs turning on/off control of a HID [high intensity discharged lamp], a DRL [daytime runmning lamp] and the like.

The electronic device X13 is a transmission control unit that performs control related to transmission.

The electronic device X14 is a body control unit that performs control (ABS [anti-lock brake system] control, EPS [electric power Steering] control, electronic suspension control and the like) related to movement of the vehicle X.

The electronic device X15 is a security control unit that performs driving control of a door lock, a security alarm and the like.

The electronic device X16 is an electronic device that is built in the vehicle X on the factory shipment stage as a standard product or a maker option product such as a wiper, an electric door mirror, a power window, a damper (shock absorber), an electric sunroof, an electric seat and the like.

The electronic device X17 is an electronic device such as a vehicle A/V [audio/visual] device, a car navigation system, an ETC [electronic toll collection system] or the like that is mounted arbitrarily on the vehicle X as a user's option product.

The electronic device X18 is an electronic device such as a vehicle blower, an oil pump, a battery cooling fan or the like that includes a high-breakdown voltage system motor.

In the meantime, the above-described insulation type switching apparatus 1 is buildable as an electric power supply device for the load Z into any one of the electronic devices X11 to X18. However, because of characteristics of the flyback type, the insulation type switching apparatus 1 is more suitable to small power output uses (power supply for a microcomputer and the like) than to large power output uses.

<Other Modifications>

In the meantime, besides the above embodiments, it is possible to add various modifications to the structure of the present invention without departing from the spirit of the present invention. In other words, it should be considered that the embodiments are examples in all respects and are not limiting, and it should be understood that the technical scope of the present invention is not indicated by the above description of the embodiments but by the claims, and all modifications within the scope of the claims and the meaning equivalent to the claims are covered.

INDUSTRIAL APPLICABILITY

The present invention is applicable to insulation type switching power supply apparatuses that are used in all fields (automobile field, industrial machine field and the like).

What is claimed is:

1. An insulation type switching power supply apparatus comprising:
   a transformer that includes a primary winding and a secondary winding that are electromagnetically connected to each other with polarities opposite to each other,
   an output switch that activates/inactivates an electric-current route that extends from an application terminal for an input voltage to a ground terminal via the primary winding, a rectifying-smoothing portion that generates an output voltage by rectifying and smoothing an induced voltage that occurs in the secondary winding, a feedback voltage generation portion that monitors a switch voltage appearing at a connection node between the primary winding and the output switch and generates a feedback voltage in accordance with the output voltage, a reference voltage generation portion that generates a reference voltage, a main comparator that compares the feedback voltage and the reference voltage with each other to generate a comparison signal, and a switching control portion that generates an output switch control signal by means of an on-time control method in accordance with the comparison signal, wherein the feedback voltage generation portion generates the feedback voltage by subtracting the input voltage from the switch voltage that is obtained during an off-time of the output switch.

2. The insulation type switching power supply apparatus according to claim 1, wherein
the reference voltage generation portion generates the reference voltage by injecting a ripple component into a constant voltage.

3. The insulation type switching power supply apparatus according to claim 1, wherein
the switching control portion includes:
an on-time setting portion that receives an input of the comparison signal to generate an on-time setting signal,
a latch circuit that generates a driver control signal in accordance with the comparison signal and the on-time setting signal, and
a driver that generates the output switch control signal in accordance with the driver control signal.

4. The insulation type switching power supply apparatus according to claim 3, wherein
the switching control portion further includes a mask process portion that fixes the comparison signal at a logical level at a bottom not-detected time over a predetermined mask period after the output switch is turned off.

5. The insulation type switching power supply apparatus according to claim 3, wherein
the on-time setting portion generates the on-time setting signal such that an on-time of the output switch changes in accordance with a duty of the output switch.

6. The insulation type switching power supply apparatus according to claim 5, wherein
the on-time setting portion includes:
a first voltage generation circuit that generates a first voltage in accordance with charge-discharge operation of a capacitor,
a second voltage generation circuit that generates a second voltage in accordance with the duty of the output switch, and
a comparator that generates the on-time setting signal by comparing the first voltage and the second voltage with each other.

7. The insulation type switching power supply apparatus according to claim 6, wherein
the second voltage generation circuit includes a CR filter that smooths the driver control signal or the output switch control signal.

8. An electronic device comprising:
the insulation type switching power supply apparatus according to claim 1, and
a load that operated by receiving supply of an output voltage from the insulation type power supply apparatus.

9. A vehicle comprising:
the electronic device according to claim 8, and
a battery that supplies electric power to the electronic device.

10. The insulation type switching power supply apparatus according to claim 2, wherein
the switching control portion includes:
an on-time setting portion that receives an input of the comparison signal to generate an on-time setting signal,
a latch circuit that generates a driver control signal in accordance with the comparison signal and the on-time setting signal, and
a driver that generates the output switch control signal in accordance with the driver control signal.

11. The insulation type switching power supply apparatus according to claim 10, wherein
the switching control portion further includes a mask process portion that fixes the comparison signal at a logical level at a bottom not-detected time over a predetermined mask period after the output switch is turned off.

12. An insulation type switching power supply apparatus comprising:
a transformer that includes a primary winding and a secondary winding that are electromagnetically connected to each other with polarities opposite to each other,
an output switch that activates/inactivates an electric-current route that extends from an application terminal for an input voltage to a ground terminal via the primary winding,
a rectifying-smoothing portion that generates an output voltage by rectifying and smoothing an induced voltage that occurs in the secondary winding,
a feedback voltage generation portion that monitors a switch voltage appearing at a connection node between the primary winding and the output switch and generates a feedback voltage in accordance with the output voltage,
a reference voltage generation portion that generates a reference voltage,
a main comparator that compares the feedback voltage and the reference voltage with each other to generate a comparison signal, and
a switching control portion that generates an output switch control signal by means of an on-time control method in accordance with the comparison signal,
wherein
the switching control portion includes:
an on-time setting portion that receives an input of the comparison signal to generate an on-time setting signal,
a latch circuit that generates a driver control signal in accordance with the comparison signal and the on-time setting signal, and
a driver that generates the output switch control signal in accordance with the driver control signal.

13. The insulation type switching power supply apparatus according to claim 12, wherein the on-time setting portion generates the on-time setting signal such that an on-time of the output switch changes in accordance with a duty of the output switch, and the on-time setting portion includes:

a first voltage generation circuit that generates a first voltage in accordance with charge-discharge operation of a capacitor, a second voltage generation circuit that generates a second voltage in accordance with the duty of the output switch, and a comparator that generates the on-time setting signal by comparing the first voltage and the second voltage with each other.

14. An insulation type switching power supply apparatus comprising:

a transformer that includes a primary winding and a secondary winding that are electromagnetically connected to each other with polarities opposite to each other, an output switch that activates/inactivates an electric-current route that extends from an application terminal for an input voltage to a ground terminal via the primary winding, a rectifying-smoothing portion that generates an output voltage by rectifying and smoothing an induced voltage that occurs in the secondary winding, a feedback voltage generation portion that monitors a switch voltage appearing at a connection node between the primary winding and the output switch and generates a feedback voltage in accordance with the output voltage, a reference voltage generation portion that generates a reference voltage, a main comparator that compares the feedback voltage and the reference voltage with each other to generate a comparison signal, and a switching control portion that generates an output switch control signal by means of an on-time control method in accordance with the comparison signal, wherein a switching frequency of the insulation type switching power supply apparatus is fixed irrespective of the output voltage.

\* \* \* \* \*